United States Patent [19]

Ferrell

[11] 4,094,371
[45] June 13, 1978

[54] DIGITAL DISPLAY FOR WEIGHING SCALES

[76] Inventor: Herbert W. Ferrell, 38799 Jonquil Dr., Newark, Calif. 94560

[21] Appl. No.: 655,014

[22] Filed: Feb. 4, 1976

[51] Int. Cl.² .......................................... G01G 23/37
[52] U.S. Cl. ........................... 177/210 R; 177/DIG. 3; 177/DIG. 6; 235/92 EV; 340/347 P
[58] Field of Search .............. 177/210 R, 25, DIG. 3, 177/DIG. 6; 235/151.33, 92 EV; 340/347 P

[56] References Cited

U.S. PATENT DOCUMENTS

| 2,656,106 | 10/1953 | Stabler | 340/347 P |
| 3,262,105 | 7/1966 | Bell | 340/347 P X |
| 3,826,318 | 7/1974 | Baumgartner | 177/25 |
| 3,967,271 | 6/1976 | Day | 177/DIG. 3 X |

Primary Examiner—Joseph W. Hartary
Attorney, Agent, or Firm—Flehr, Hohbach, Test, Abritton & Herbert

[57] ABSTRACT

System for providing a digital indication of the load on a scale, utilizing a relative position transducer to produce two output signals which vary between fixed levels in response to incremental displacements of the output indicator of the scale. The two signals are phase encoded in that one of the signals leads the other, depending upon the direction of displacement. The two signals are processed to determine the occurrence and direction of each increment of displacement, and the count in a digital counter is incremented or decremented in response to each increment according to the direction of the displacement.

1 Claim, 6 Drawing Figures

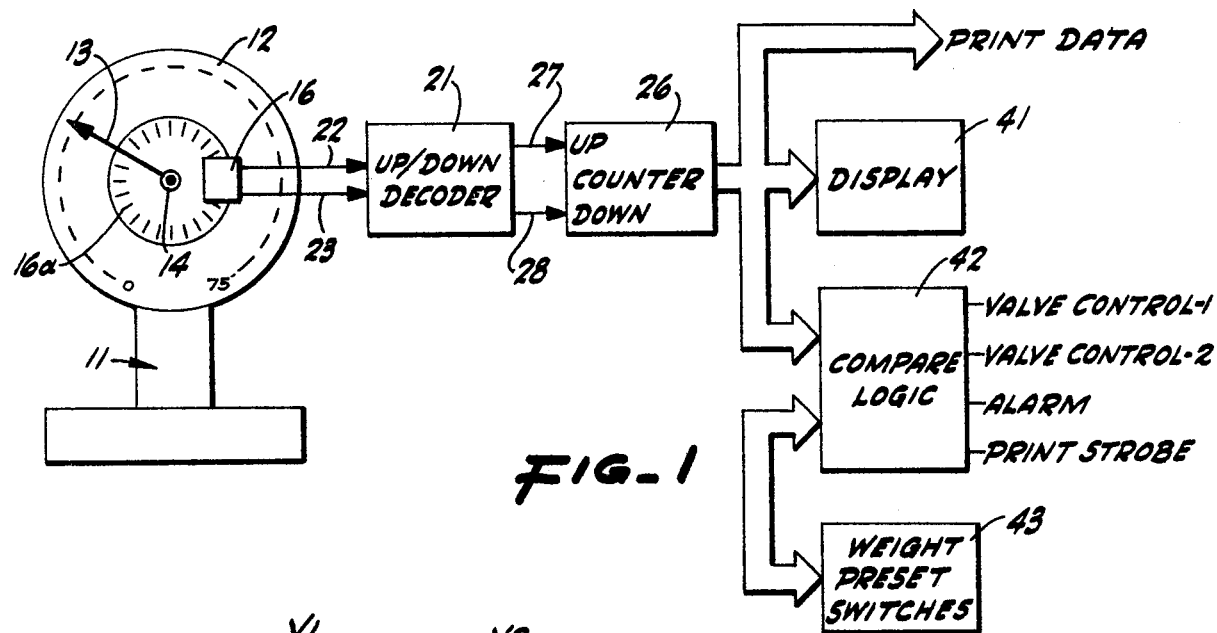
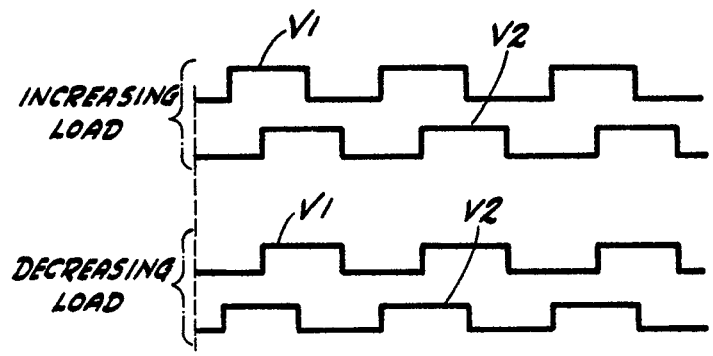
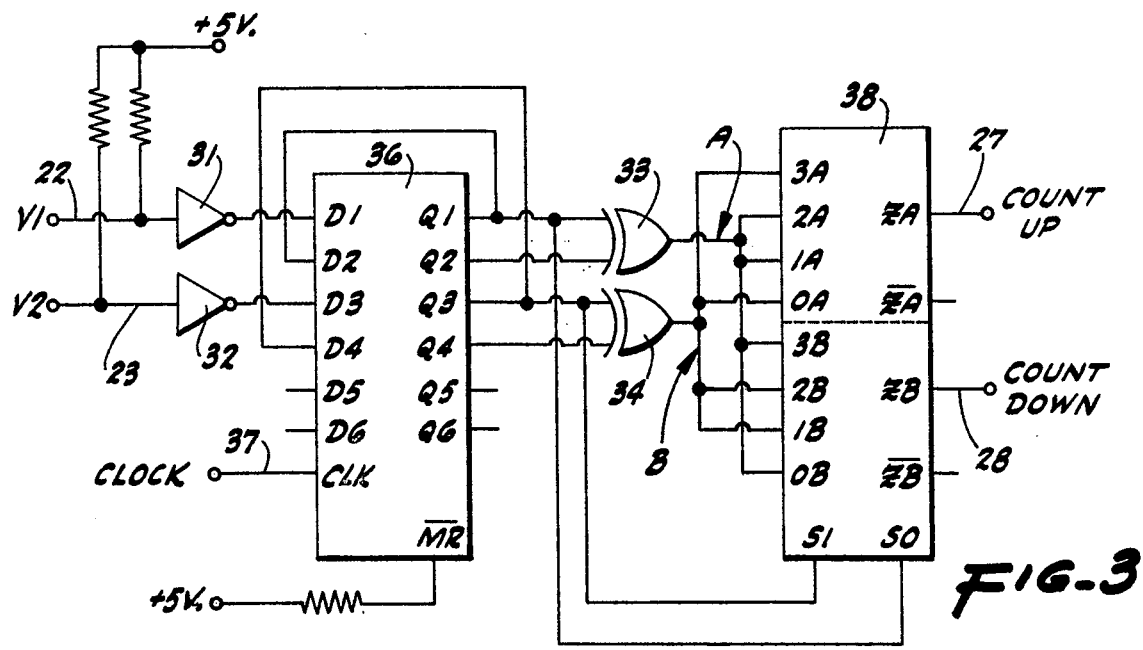

DIGITAL DISPLAY FOR WEIGHING SCALES

BACKGROUND OF THE INVENTION

The invention pertains generally to scales and weighing apparatus and more particularly to a system for providing a digital indication of the load on a scale.

Heretofore, there have been attempts to provide a digital indication of the load on a scale utilizing an absolute position encoder connected to the pinion or shaft of a mechanical weight indicator on the scale. The encoder produces a unique binary output signal for each incremental position of the shaft through up to 360° of shaft rotation, and the binary signals so produced are decoded by electronic circuitry and processed for display or other desired use.

While an absolute position encoder is capable of providing all of the information required for determining the weight of the load, such devices are costly and complex, and they must be aligned very accurately to provide accurate results. Moreover, they are binary encoded devices which must simultaneously present a number of parallel data bits for each increment of displacement. The number of bits required is determined by the resolution of the scale and the accuracey of display desired. For example, in order to detect one ounce increments on a scale having a 75 pound capacity, eleven bits are required for each increment. The circuitry required for processing this number of bits is complex and relatively expensive.

SUMMARY AND OBJECTS OF THE INVENTION

The invention utilizes a relative position transducer which produces two output signals which vary between fixed levels in response to incremental displacements of the output indicator of the scale. The two signals are phase encoded in that one of the signals leads the other, depending upon the direction of displacement. These two signals are processed to determine the occurrence and direction of each displacement, and the count in a counter is incremented or decremented in response to each increment according to the direction of displacement.

It is in general an object of the invention to provide a new and improved system for providing a digital indication of the load on a scale.

Another object of the invention is to provide a system and method of the above character utilizing a relative position transducer for providing phase encoded signals in response to incremental displacement of the scale.

Another object of the invention is to provide a system of the above character in which the incremental changes are counted to determine the load on the scale.

Additional objects and features of the invention will be apparent from the following description in which the preferred embodiments are set forth in detail in conjunction with the accompanying drawings.

BRIEF DESCRIPTION OF THE DRAWINGS

FIG. 1 is a block diagram of one embodiment of a digital weight indicating system according to the invention.

FIG. 2 is a graphical representation of the output signals produced by the transducer of the embodiment of FIG. 1 for increasing and decreasing loads.

FIG. 3 is a detail block diagram of the circuitry for processing the transducer signals in the embodiment of FIG. 1.

FIG. 4 is a truth for the multiplexer in the processing circuitry of FIG. 3.

DESCRIPTION OF THE PREFERRED EMBODIMENT

Figure 5:
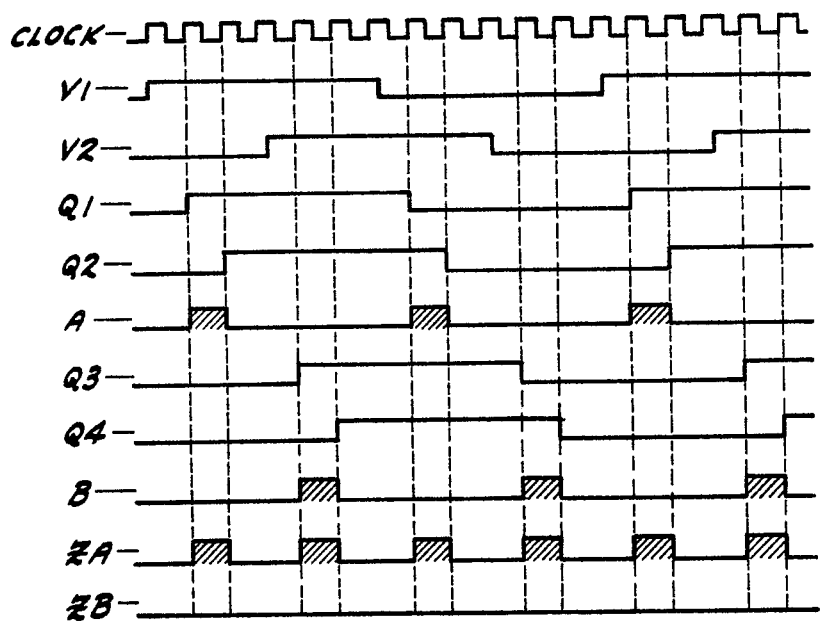
FIG. 5 is a wave form diagram illustrating the operation of the system for an increasing load.

In FIG. 1, the invention is illustrated in conjunction with a conventional platform scale 11 having a dial head 12 and an indicator 13 affixed to an output shaft 14 and linked mechanically to the platform for indicating the weight of a load on the platform.

A relative position transducer 16 is connected to output shaft 14 for producing electrical signals in response to an increase or decrease in the load on the scale. A particularly suitable transducer for this purpose is an incremental optical encoder, such as Renco Corporation, Goleta, Calif., Models KT-15 and KT-23. Briefly, the transducer includes an incrementally marked disk 16a which is connected for rotation with shaft 14, an incrementally marked mask which is mounted in a stationary position, two LED light sources positioned for passing light through the disk and mask, two phototransistors positioned for receiving the light passing through the disk and mask, and two signal amplifiers connected to the phototransistors. The incremental markings on the disk are uniformly spaced radially extending opaque lines arranged in an annular track toward the periphery of the disk. The markings on the mask are similar to the markings on the disk, but arranged in two groups displaced from each other by a distance corresponding to an odd multiple of of one-half of the spacing between the lines. The lines in each group are aligned alternately with the lines on the disc when the diak rotates. One photocell and phototransistor is associated with each group, and the amplifiers produce generally rectangular output signals V1, V2 which change from a low level to a high level and return to the low level each time shaft 14 rotates through an angle of 360°/N, where N is the number of incremental marks on the disk. The resolution of the system is largely dependent on the number of increments on the disk, and disks having on the order of 1000–1200 increments will provide high resolution for scales having capacities as high as 1000–1200 pounds.

As illustrated in FIG. 2, the transducer output signals are 90° out of phase with respect to each other. For increasing loads V1 leads V2, and for decreasing load V1 follows V2. As used herein, the term leading designates a signal which makes a transistion from the same state as the other signal to the opposite state, and the term following or lagging designates a signal which changes from the opposite level to the same level as the other signal.

The output signals from transducer 16 are applied to the inputs of an up/down decoder 21 via lines 22, 23. In the decoder, the transducer signals are processed to detect the occurrence and direction of shaft movement, and outputs of the decoder are connected to the inputs of an up/down counter 26 via lines 27, 28. As discussed more fully hereinafter, the count in the counter is incremented in response to each increment of movement produced by an increasing load and decremented in response to each increment of movement produced by a decreasing load.

As illustrated in FIG. 3, up/down decoder 21 includes inverters 31, 32 having inputs connected to lines 22, 23 respectively. The outputs of the inverters are connected to the inputs D1, D3 of two D-type flip-flops, and the outputs Q1, Q3 of these flip-flops are connected to first inputs of exclusive OR gates 33, 34. The Q1 and Q3 outputs are also connected to inputs D2, D4 of additional flip-flops, and the outputs Q2, Q4 of these flip-flops are connected to second inputs of gates 33, 34. The four flip-flops can be constructed in integrated form and housed in a single package 36, if desired, and in the preferred embodiment, they constitute four sections of a type 74174 hexagonal D-type flip-flop. Clock pulses are applied simultaneously to all of the flip-flops on a line 37 connected to the CLOCK input of the package.

The outputs of OR gates 33, 34 are each connected to four inputs of an eight input multiplexer 38. The outputs of the multiplexer are connected to the UP and DOWN counting inputs of counter 26 via lines 27, 28. Control signals are applied to the multiplexer from the Q1 and Q3 outputs of the flip-flops. In the preferred embodiment, the multiplexer is a type 9309 dual 4 to 1 multiplexer, each section of which has input ports 0-3 and an output port Z. The two sections of the multiplexer share common control signals S0, S1, and in each section the inputs are gated to the output in accordance with the truth table of FIG. 4.

As illustrated in FIG. 3, the output of OR gate 33 is connected to the 1A, 2A, 0B and 3B inputs of multiplexer 38, and the output of OR gate 34 is connected to the 0A, 3A, 1B and 2B inputs of the multiplexer. The Q1 flip-flop output is connected to control input S0, and the Q3 flip-flop output is connected to control input S1.

Operation and use of the system, and therein the method of the invention, can be described with reference to FIGS. 5 and 6. Initially, it is assumed that the load on the scale is increasing so that transducer signal V1 leads signal V2 by 90°, as illustrated in FIG. 5. Each time shaft 14 rotates through an angle corresponding to one increment on disk 16a, signals V1 and V2 rise from a low level to a high level and return to the low level. Flip-flop output Q1 follows transducer signal V1, and flip-flop output Q2 follows output Q1. When the flip-flop outputs are at different levels, OR gate 33 delivers an output pulse A. Since the Q1 and Q2 outputs are at different levels after each transistion in transducer signal V1, OR gate 33 produces one pulse in response to each transistion of signal V1.

Similarly, flip-flop Q3 follows transducer output V2, flip-flop output Q4 follows output Q3, and OR gate 34 delivers an output pulse B in response to each transistion in transducer signal V2. Thus, it can be said that the flip-flops and OR gates detect the occurrence of shaft movement, and, as discussed more fully hereinafter, multiplexer 38 detects the direction of the movement.

At the time of the first pulse from OR gate 33, output Q1 is high and Q2 is low, and the multiplexer passes the pulse at input 2A to output ZA and, thus, to the UP counting input of counter 26. At the time of the first pulse from OR gate 34, outputs Q1 and Q2 are both high, and the multiplexer delivers the pulse from input 3A to the UP counting input of the counter. At the time of the second pulse from OR gate 33, output Q1 is low and Q2 is high, and the multiplexer delivers the pulse from input 1A to the UP counting input of the counter. At the time of the second pulse from OR gate 34, outputs Q1 and Q2 are both low, and the multiplexer delivers the pulse from input 0A to the UP counting input of the counter. Thus, it can be seen that when the load is increasing, the pulses produced by gates 33, 34 are always applied to the UP counting input of counter 26, and the count increases accordingly.

Figure 6:
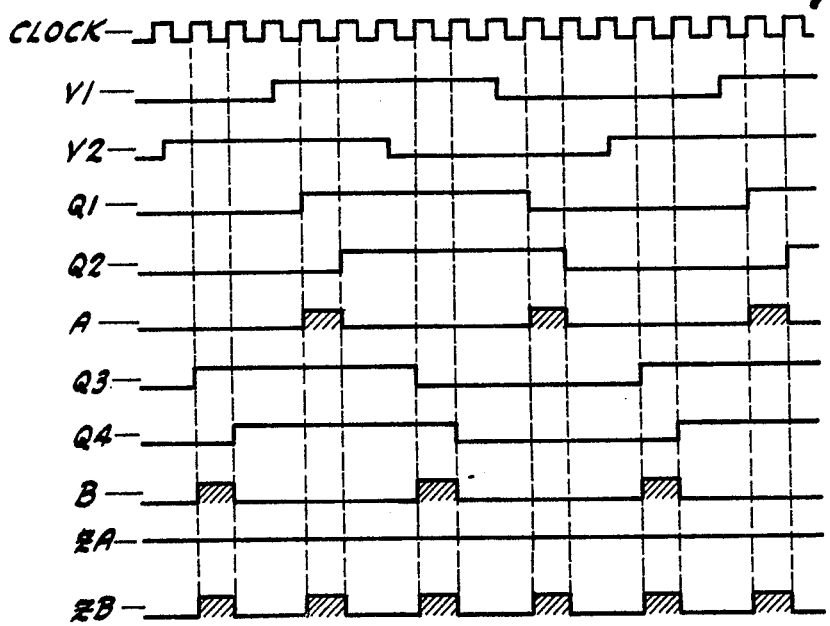
FIG. 6 is a wave form diagram illustrating the operation of the system for a decreasing load.

In the event of a decreasing load on the scale, transducer signal V2 leads signal V1, as illustrated in FIG. 6. As in the case of the increasing load, flip-flop outputs Q1 and Q3 follow transducer signals V1 and V2, flip-flop outputs Q2 and Q4 follow outputs Q1 and Q3, and OR gates 33 and 34 deliver pulses A and B in response to the transistions in signals V1 and V2. In this case, however, the multiplexer steers all of the pulses from gates 33, 34 to the DOWN counting input of counter 26, and the count decreases accordingly.

Referring again to FIG. 1, the output of counter 26 is connected to a digital display 41 which provides a digital indication of the load on the scale. Net weight can be determined at any time simply by resetting counter 26 to zero, following which the count will correspond to the subsequent increase or decrease in the load.

FIG. 1 also illustrates the use of the invention to provide automated filling of a container on the scale. For this purpose, the output of counter 26 is also connected to a logic circuit 42 which delivers output signals for controlling the operation of valves which control the flow of desired materials into the container. Weight preset switches 43 are connected to the logic circuit and provide means for setting the weights at which the valves are opened and closed. The logic circuit compares the output of the counter with the signals from the switches and delivers the control signals to the valve accordingly. As also illustrated in FIG. 1, the output of the counter can be delivered to a printer or other suitable recording device which can be controlled by logic circuit 42.

The invention has a number of important features and advantages. It can readily be added to an existing scale to provide a digital weight display and digital signals which can be recorded or utilized to control other equipment, as desired. Regardless of the resolution desired, only two data bits are required, and only one of these is produced for each increment of displacement. This results in a less complicated, less expensive, more flexible and more reliable system than has heretofore been possible.

It is apparent from the foregoing that a new and improved system and method for providing a digital indication of a load on a scale have been provided. While only the presently preferred embodiments have been described herein, as will be apparent to those familiar with the art, certain changes and modifications can be made without departing from the scope of the invention as defined by the following claims.

What is claimed is:

1. In apparatus for providing a digital signal indicative of the load on a scale having a member operatively connected to the member for providing first and second electrical signals which change from a first level to a second level and return to the first level each time the member moves a predetermined amount, the first signal leading the second signal when the member moves in a first direction and the second signal leading the first signal when the member moves in a second direction, a first pair of cascaded flip-flops to which the first signal is applied, a second pair of cascaded flip-flops, a first exclusive OR gate connected to the outputs of the flip-flops in the first pair, a second exclusive OR gate connected to the outputs of the flip-flops in the second pair, up/down counting means, and multiplexing means responsive to the outputs of the flip-flops for delivering pulses from the OR gates to the counting means to be counted in a direction corresponding to the direction in which the displaced member moves.

* * * * *